Figure 9:
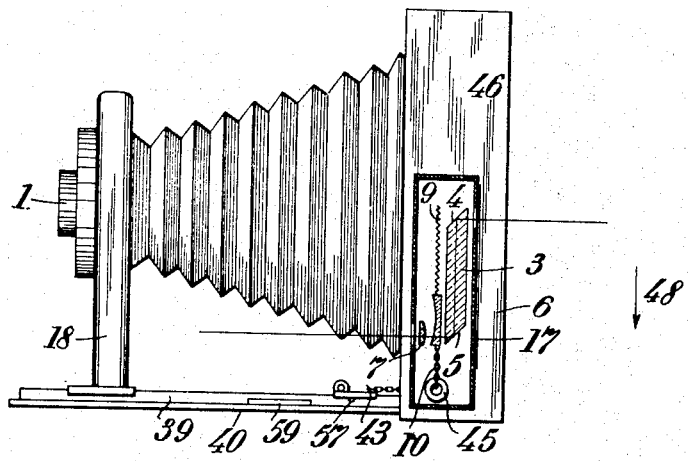

Aug. 8, 1933.  H. F. TÖNNIES  1,921,898
FOCUSING DEVICE FOR PHOTOGRAPHIC CAMERAS
Filed June 18, 1928  3 Sheets-Sheet 1
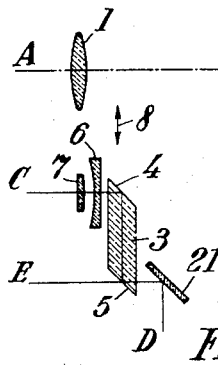
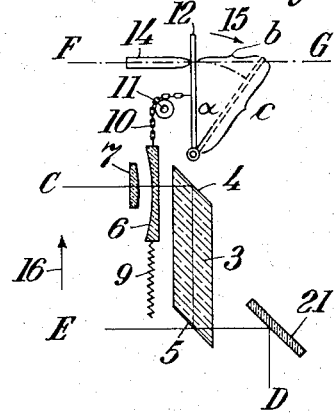
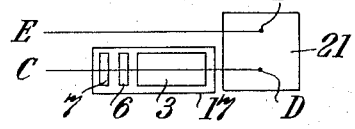
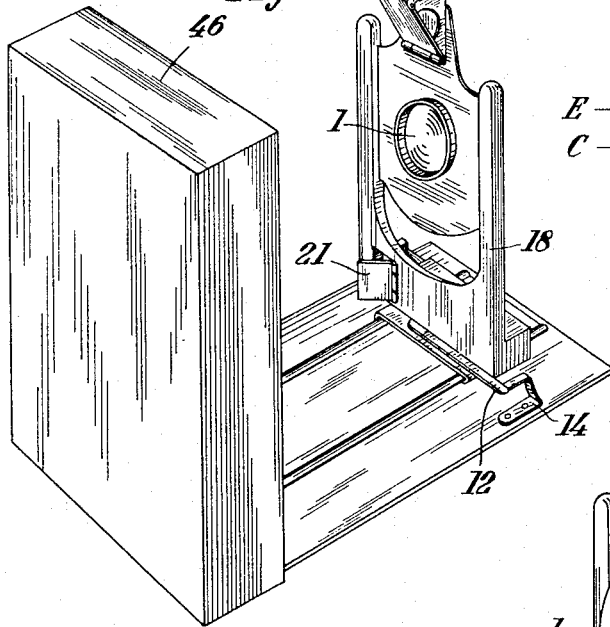
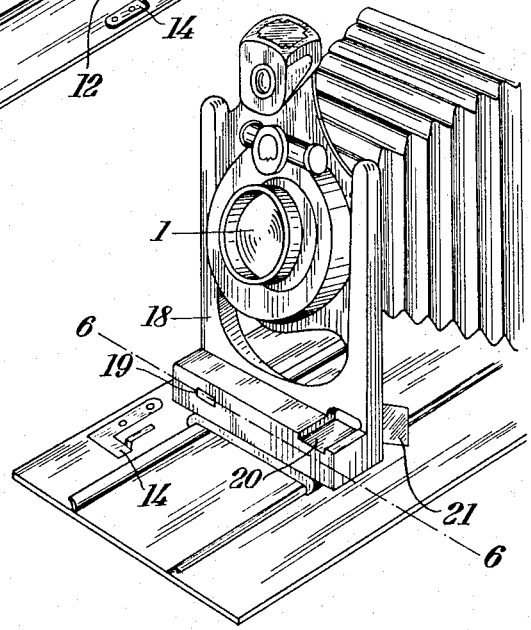
Inventor:
Hans Ferdinand Tönnies,
By Byrnes, Townsend & Potter,
Attorneys.

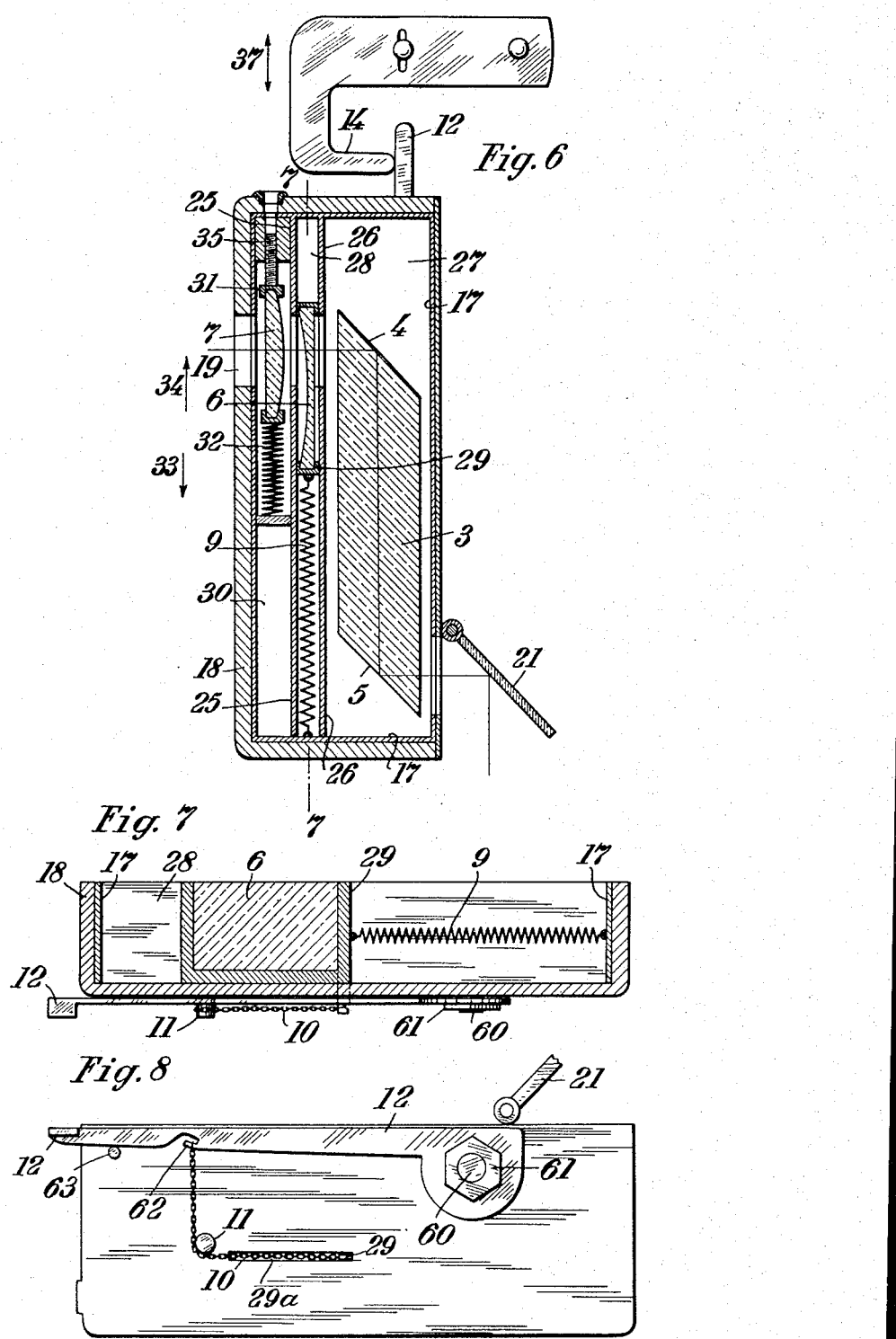

Aug. 8, 1933.  H. F. TÖNNIES  1,921,898
FOCUSING DEVICE FOR PHOTOGRAPHIC CAMERAS
Filed June 18, 1928   3 Sheets-Sheet 3

Inventor:
Hans Ferdinand Tönnies
By Byrnes, Townsend & Potter
Attorneys.

Patented Aug. 8, 1933

1,921,898

UNITED STATES PATENT OFFICE 1,921,898

FOCUSING DEVICE FOR PHOTOGRAPHIC CAMERAS

Hans Ferdinand Tönnies, Altona-Gross-Flottbek, Germany, assignor to I. G. Farbenindustrie Aktiengesellschaft, Frankfort-on-the-Main, Germany Application June 18, 1928, Serial No. 286,297, and in Germany June 24, 1927

9 Claims. (Cl. 95—44)

The invention relates to an optical device for focusing photographic cameras without using the customary focusing screen.

The principal objects of the invention are to provide a device of this kind which can be made more exactly and easily in the factory, so that the price of a camera provided with the device will not be much higher than without it. Furthermore to enable the device to show correct focus even for short distances (between 1 and 2 yards), whereas in contradistinction to the known devices of this kind which could hitherto not be used for shorter distances than 2 yards. Other objects of the invention are to make the device more reliable, so that it cannot be disarranged by concussions and to have all parts, especially the optical parts, entirely enclosed in a case to protect them against dirt, and contact with extraneous objects.

Further objects and advantages of the invention will appear hereinafter.

The invention consists in an optical focusing device for photographic cameras, the partial images of which are obtained by means of two parallel mirror surfaces arranged at a short distance from one another at opposite ends of a short optical base to which they are inclined, and lenses of the same focal length but of opposite sign, arranged one behind the other in the path of the rays through the device, one of said lenses being adjustable for focusing in a direction at right angles to its optical axis, characterized in that the lenses are placed in front of and parallel to the base and the movement of the focusing lens takes place parallel to the base. Preferably the combination is used in which the lenses are arranged in front of a rhombohedric prism. This arrangement is improved by using strips of cylindrical lenses. By the use of this arrangement all optical elements can be enclosed in a casing having no protruding parts, and furthermore,—especially if cylindrical lenses and a prism are employed,—the arrangement is not subject to the danger of readily getting out of adjustment, which is a most important feature in a device of this kind. The arrangement of the lenses in front of the prism also makes it possible to give the device a very flat shape, for example, ⅛th of an inch in breadth, thereby enabling the device to be fixed on one side or on top of the box of the camera without protruding much, or to be arranged below the lens in the lens carriage. This flat shape of the device is also very important in view of the fact that there is very little spare room in a camera when folded, especially if it is equipped with an objective of large diameter.

Another feature of the invention consists in constructing the device in such a way that only the light rays belonging to one end of the base pass through the device, whereas the rays belonging to the other end do not enter the device, but pass right over it into the eye of the observer.

In a preferred constructional form according to the invention, the device is arranged on one side of the body of the camera and connected by a chain passing through a hole in the wall of the body to the carrier of the camera lens.

Figure 10:
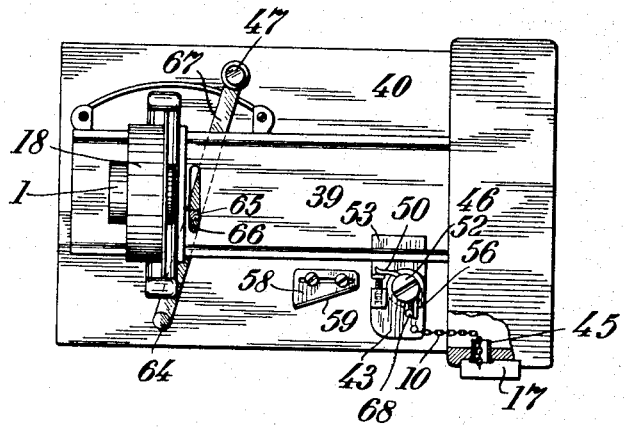
Figure 11:
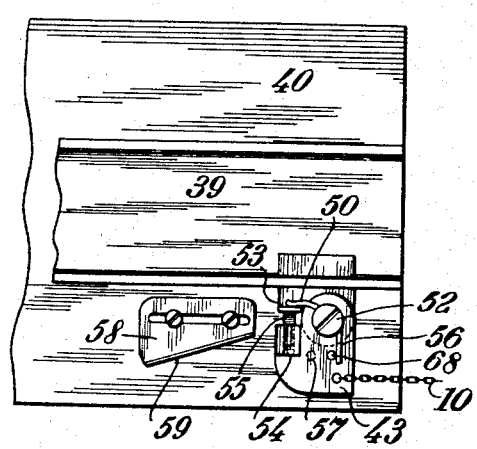
Figure 12:
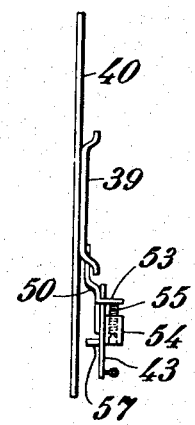

In the accompanying drawings Figs. 1 and 2 are diagrammatic views seen from above; Fig. 3 is a side view of the diagrammatic arrangement shown in Fig. 1; Figs. 4 and 5 show a perspective view of a camera with the device enclosed within the lens carriage; Fig. 6 is a section through the lower part of the carriage with the enclosed device taken on line 6—6 of Fig. 4; Fig. 7 shows a section of the device taken on line 7—7 of Fig. 6; Fig. 8 shows a bottom view of the device enclosed within the carriage; Fig. 9 is a side view of a camera provided with the device on one side of the body, the cover of the device being removed; Fig. 10 is an elevation thereof; Fig. 11 is a plan of the bed of the camera showing some mechanical parts coordinated to the device and arranged upon the bed; and Fig. 12 is a front view of this arrangement. The same reference characters indicate corresponding parts.

According to the invention the lenses 6 and 7, preferably small strips of cylindrical lenses, are arranged in front of a rhombic prism 3. The prism forms the optical base of the device. The rays are reflected by the planes 4 and 5 of the prism. The lenses have the same focal length, one is positive and the other negative and one of them can be moved in the direction of the arrow 8 parallel to the base. The prism and the two lenses are very flat, for instance, only ⅛ of an inch wide and only the rays C—D reflected by the planes 4 and 5 pass through the optical parts, whereas the rays E—D from the other end of the base pass over the prism directly into the eye of the observer.

The line A—B indicates the optical axis of the camera having a lens 1, and the line 2 the screen of the camera.

The focusing device is arranged so that the lens-strips and the base of the prism are placed perpendicularly to the axis A—B of the camera lens.

The movement of the lens 6 is in such a way related to the movement of the lens 1 that, if the latter is in correct focus, the rays C—D and E—D coincide after passing through the device as diagrammatically shown in Fig. 2.

The lenses 6 and 7 and the prism 3 are entirely enclosed by a casing.

The device can be arranged at different parts of the camera, for instance, under the camera lens, within its carriage or upon the body of the camera.

Figs. 4 to 8 show the device arranged in a recess in the lens carriage. The lenses 6 and 7 and the prism are housed in separate chambers in this recess. The lens 6 is carried by a slide to one end of which a spring 9 is attached and to the other end a chain 10 that is passed around a roller 11 and linked to the lever 12. The lever is journaled in the casing of the carriage and can be turned in the direction of the arrow 15. Upon the bed of the camera a hook 14 is attached, which is in contact with the end of the lever 12, when the camera lens is moved forwardly. By the continuance of this movement the lever is turned and the lens 6 pulled along the base. When the camera lens is moved backward, the pull at the lens 6 is relaxed and the latter is drawn back accordingly by the coil spring 9.

Figs. 6 to 8 show the details of this arrangement.

The rhombic prism 3 is enclosed in the chamber 27, the lens 6 in the chamber 28 and the lens 7 in the chamber 30. The chambers are separated by the walls 25 and 26. The lens 6 is carried by a slide 29 and the lens 7 by a slide 31. All parts are enclosed by the lower part of the lens carriage. The lens 7 is provided with an adjusting arrangement which consists of a coil spring 32 pushing the slide 31 against the adjusting screw 35. At the back of the device a mirror 21 is journaled. By this mirror the rays passing through the optical parts and passing over them through the channel 20 are reflected into the eye of the observer. The mirror 21 closes up when the camera is folded and is opened automatically by means of a helical spring (not shown in the drawings) which is wound around the pivot pin of the mirror.

This arrangement contains the means to enable the device to indicate the correct focus even for distances shorter than 2 yards. For this purpose the movement of the lens 6 has to be slackened in comparison to the movement of the camera lens progressively. This slackening is occasioned by the difference of the rectilinear movement of the lens carriage along the hook 14 in the line F—G and the revolving movement of the lever 12.

This may be seen from Fig. 2. When the carriage 18 is drawn out, the hook or stop 14 passes the carriage in the direction of the line F—G. The end of the lever 12, however, moves on an arc of a circle. When drawing out the carriage 18, this circular path of the end of lever 12 at first is nearly proportional to the alteration $b$ of the position of the hook 14 with respect to the carriage. With a further drawing out, however, this annular movement becomes smaller, when compared with the rectilinear path $b$, according to the sinus law $$\left(\sin\alpha = \frac{b}{c}\right),$$

since the angle $a$ is determined by $b$ and by the hypothenuse $c$ given by the position of the lever 12. By this arrangement, even in the case of short distances, an exactly defined picture is obtainable.

The optical formulæ of the lenses 6 and 7, the proper location of the pivot of lever 12 and the proper location of a point of attachment of chain 11 vary with the formula of the focal length of the objective 1 of the camera. These values may be calculated in every case according to the well-known optical and trigonometrical laws.

The cooperation of slide 29, chain 10, roller 11, and lever 12 is illustrated in Figs. 7 and 8. One side of the slide 29 is extended so as to form a hook which is slidable in the slot 29a. The chain 10 is attached with its one end to the hook of the slide 29 and with the other end to the lever 12 provided with the hook 62, the lever being rotatable about a pivot 60 and fixed to said pivot by means of the nut 61. Spring 9 exerts a pull on the slide 29 and by transmission of chain 10 turning round the roller 11, on the lever 12, pressing the same against a pin 63 serving as an abutment. When protruding the carriage of the camera, lever 12 will be kept in its position by member 14, but the lens 6 will be displaced against the action of spring 9.

The adjustment for infinity and for short range is performed as follows. The carriage 18 is drawn out of the body of the camera upon the bed until the camera lens 1 is focused correctly for infinity in the ordinary manner employed in camera factories by temporarily using a screen. When the camera is held in such position that the operator looks into the mirror 21 from above a horizontal line at a considerable distance will probably appear broken. By turning the screw 35 the parts of the image of the line will be made continuous, thereby adjusting the device for infinity. The camera lens is then focused in the aforesaid manner on an object, for instance, 1 yard distant. Looking through the mirror 21 a horizontal line of this object will now appear broken, but is made continuous too by moving the hook 14 in one direction or the other of the arrow 37. The hook is then fastened by screws in this position upon the camera bed.

When the camera and the device have been focused and adjusted in accordance with one another in this manner for a short distance and for infinity, the optical systems of the device and the camera will exhibit the proper relationship between one another for all the intermediate distances lying between the said short distance and infinity.

The Figs. 9 to 12 show the arrangement of the device upon one wall of the body of the camera. This arrangement offers the great advantage of enabling the photographer to focus the camera by observing the objects in a straight line.

The focusing instrument 17 is fastened upon the wall 46 of the body of the camera. To the carrier of the lens 6 a chain 10 is attached which passes through a pipe 45 that penetrates the wall 46. The other end of the chain is linked to a plate 43 that is carried by the extension bed 39 which can be moved on the bed 40. The extension bed bears the lens carriage 18. It can be moved forward or backward by the radial lever 47. When the lens carriage and the lens 1 are moved forward with the extension bed 39, the chain 10 is pulled by the plate 43 and the lens 6 inside the focusing device accordingly. When the bed 39 is moved backward, the lens 6 is pulled back by the coil spring 9. Hereby the camera can be exactly focused by holding the camera so that the optical base is kept in a horizontal position, and then looking through the focusing instrument 17 at a vertical line of the object to be photographed, and by moving the camera lens 1 so far forward until the said vertical line appears continuous.

To enable the device to work correctly also for short range pictures a compensating mechanism is arranged upon the bed of the camera. This mechanism consists of two parts, illustrated in Figs. 11 and 12. One part is attached to the extension bed 39 and the other to the bed 40. The plate 50 provided with the edge 53 is pivotally connected to a supporting plate 50 by means of a screw 52. The plate 50 is carried by the extension bed 39. Upon the bed 40 a plate 58 bearing an upwards bent edge 59 is attached by screws. When the extension bed 39 is moved forward, the bolt 57 carried by the plate 43 comes into contact with the edge 59 and when the movement is continued the plate 43 is turned a little around the screw 52 against the action of the spring 56 which presses the plates 50 and 43 together by pressing against the edge 53 and against a pin 68. In this way the pull at the chain 44 is slackened. By giving the edge 59 the proper angular inclination and the plate 58 the right position upon the bed 40 the pull at the chain can be lessened just so much that the focusing device is showing the proper indication also for the short ranges. The edge 59 can be given a slight curve if preferred.

This arrangement is adjusted in the following way. The carriage 18 with the lens 1 is drawn out upon the extension bed until the pull is stopped in the ordinary manner employed in cameras. At this point it has to be properly focused for infinity distance. Now the screw 55 is so much turned to the right or to the left until the device 17 shows adjustment for infinity.

It will be understood that the movement of the screw 55 causes the plate 43 to turn around the screw 52 upon the plate 50. The said plate 43 is under the action of the spring 56 which presses the point of the screw 55 against the edge 53 of the plate 55. This done, the extension bed is moved forward until the camera lens is focused at a one-yard distance. The lens 6 is pulled hereby along the lens 7 but most likely the instrument will not show proper adjustment for this distance. In order to ensure this the plate 58 is moved forward or backward until the adjustment of the device is obtained for this distance also. In this position the plate 58 is screwed down upon the bed 40.

Instead of the plate 43 the screw 55 can also be situated in the instrument 17 working against the lens 7 corresponding to the arrangement shown by Fig. 6.

The movement of the carriage 18 for focusing the camera may be effected in any known manner, for instance as shown in Fig. 10 by means of a lever mechanism. The extension bed 39 is provided with a slot 66; on the bed 40 there is mounted a lever 67 provided with a pin 65 and a knob 47, and rotatable about a pivot 64. In order to focus the objective to a near distance the knob 47 is removed from the wall 46, whereby the pin 65 protrudes the carriage while sliding in the slot 66.

The adjustment described offers the further advantage of permitting the use of camera lenses with small variations from the correct focal length. The focal lengths of the commercial camera lenses vary plus and minus up to about 5%. This variation can easily be balanced by the compensation arrangement combinated with the described focusing device.

The use of cylindrical lenses is of particular importance as hereby the manufacturing costs are considerably reduced. The very small lens-strips can easily be ground and polished in large numbers at one time whereas if strips of spherical lenses are used the cutting and grinding of these strips cut out of spherical lenses involves much greater difficulties which make the price many times higher, inasmuch as it is necessary for the production of said strips of spherical lenses first to make the lens in the ordinary circular form and then to cut or grind the strip out of the middle thereof. The cylindrical lenses offer the further advantage that they need no adjustment in the plane parallel to the axis of the curvature, because they possess no deflecting power in this plane.

Although I prefer to use prisms for producing the base single mirrors may also be used instead in combination with the lens-strips arranged parallel to the base. Other alterations will be possible without departing from the scope of the invention.

I claim as my invention:

1. The combination, in a focusing device for a camera having an adjustable lens, of a pair of reflecting devices inclined to the optical axis of said camera lens, both having a fixed and parallel inclination and forming the optical base of the focusing device, this optical base being positioned perpendicularly to the optical axis of said camera lens, two focusing lenses arranged in front of one of said inclined reflecting devices with their optical axis perpendicular to said optical base of the focusing device, one of the focusing lenses being in a fixed position, the other being displaceable perpendicularly to its optical axis, means located behind the other of said inclined reflecting devices which permit viewing the object to be photographed in two partial pictures, one partial picture of said object being directly produced in said viewing means and the other partial picture being produced in said viewing means through said optical base and said focusing lenses, and means for connecting said displaceable focusing lens with the camera lens in a fixed relationship, so that, when altering the position of the said displaceable focusing lens in such a manner that the said two partial pictures coincide, the camera is in focus.

2. The combination, in a focusing device for a camera having an adjustable lens, of a pair of reflecting devices inclined to the optical axis of said camera lens, both having a fixed and parallel inclination and forming the optical base of the focusing device, this optical base being positioned perpendicularly to the optical axis of said camera lens, two focusing lenses arranged in front of one of said inclined reflecting devices with their optical axis perpendicular to said optical base of the focusing device, one of the focusing lenses being in a fixed but adjustable position, the other being arranged between said fixed focusing lens and the optical base and being displaceable perpendicularly to its optical axis, means located behind the other of said inclined reflecting devices which permit viewing the object to be photographed in two partial pictures, one partial picture of said object being directly produced in said viewing means and the other partial picture being produced in said viewing means through said optical base and said focusing lenses, and means for connecting said displaceable focusing lens with the camera lens in a fixed relationship, so that, when altering the position of the said displaceable focusing lens in such a manner that the said two partial pictures coincide, the camera is in focus.

3. The combination, in a focusing device for a camera having an adjustable lens, of a pair of reflecting devices inclined to the optical axis of said camera lens, both having a fixed and parallel inclination and forming the optical base of the focusing device, this optical base being positioned perpendicularly to the optical axis of said camera lens, two focusing lenses arranged in front of one of said inclined reflecting devices with their optical axis perpendicular to said optical base of the focusing device, one of the focusing lenses being in a fixed but adjustable position, the other being arranged between said fixed focusing lens and the optical base and being displaceable perpendicularly to its optical axis, means located behind the other of said inclined reflecting devices which permit viewing the object to be photographed in two partial pictures, one partial picture of said object being directly produced in said viewing means and the other partial picture being produced in said viewing means through said optical base and said focusing lenses, and means for connecting said displaceable focusing lens with the camera lens in a fixed relationship, so that, when altering the position of the said displaceable focusing lens in such a manner that the said two partial pictures coincide, the camera is in focus, the optical elements of the device being enclosed in a common casing provided with openings in front of said focusing device for admission of light rays reflected by said object into said focusing device and an opening on the rear side for the production of the two partial pictures in said viewing means.

4. The combination, in a focusing device for a camera having an adjustable lens, of a pair of reflecting devices inclined to the optical axis of said camera lens, both having a fixed and parallel inclination and forming the optical base of the focusing device, this optical base being positioned perpendicularly to the optical axis of said camera lens, two cylindrical focusing lenses arranged in front of one of said inclined reflecting devices with their optical axis perpendicular to said optical base of the focusing device, one of the focusing lenses being in a fixed but adjustable position, the other being arranged between said fixed focusing lens and the optical base and being displaceable perpendicularly to its optical axis, means located behind the other of said inclined reflecting devices which permit viewing the object to be photographed in two partial pictures, one partial picture of said object being directly produced in said viewing means and the other partial picture being produced in said viewing means through said optical base and said focusing lenses, and means for connecting said displaceable focusing lens with the camera lens in a fixed relationship, so that when altering the position of the said displaceable focusing lens in such a manner that the said two partial pictures coincide, the camera is in focus.

5. The combination, in a focusing device for a camera having an adjustable lens of a rhombic prism provided with two reflecting planes and forming the optical base of the focusing device, this optical base being positioned perpendicularly to the optical axis of said camera lens, two focusing lenses arranged in front of one of said inclined reflecting devices with their optical axis perpendicular to said optical base of the focusing device, one of the focusing lenses being in a fixed but adjustable position, the other being arranged between said fixed focusing lens and the optical base and being displaceable perpendicularly to its optical axis, means located behind the other of said inclined reflecting devices which permit viewing the object to be photographed in two partial pictures, one partial picture of said object being directly produced in said viewing means and the other partial picture being produced in said viewing means through said optical base and said focusing lenses, and means for connecting said displaceable focusing lens with the camera lens in a fixed relationship, so that when altering the position of the said displaceable focusing lens in such a manner that the said two partial pictures coincide, the camera is in focus.

6. The combination, in a focusing device for a camera having an adjustable lens, of a casing provided in front with an opening for admitting light rays reflected by an object to be focused, and on the rear side with an observing opening, said casing being subdivided into three chambers, in one of said chambers a rhombic prism provided with two reflecting planes forming the optical base of the device, said optical base being positioned perpendicularly to the optical axis of said camera lens, one of said reflecting planes being adjacent to the observing opening, in the front chamber and in front of the other reflecting plane a cylindrical focusing lens located in a fixed, but adjustable position between a screw and a coil spring, in the middle chamber a second cylindrical focusing lens carried by a slide and attached on one end with a spring to the casing and being displaceable perpendicularly to its optical axis, the optical axis of said focusing lenses being perpendicular to said optical base, a mirror located behind said observing opening which permits viewing the object to be photographed in two partial pictures, one partial picture of said object being directly produced in said mirror and the other partial picture being produced in said mirror through said rhombic prism and said focusing lenses, and means for connecting said displaceable focusing lens with the camera lens in a fixed relationship, so that, when altering the position of said displaceable focusing lens in such a manner that the said two partial pictures coincide the camera is in focus.

7. The combination, in a focusing device for a camera having an adjustable lens, of a casing provided in front with an opening for admitting light rays reflected by an object to be focused, and on the rear side with an observing opening, said casing being subdivided into three chambers, in one of said chambers a rhombic prism provided with two reflecting planes forming the optical base of the device, said optical base being positioned perpendicularly to the optical axis of said camera lens, one of said reflecting planes being adjacent to the observing opening, in the front chamber and in front of the other reflecting plane a cylindrical focusing lens located in a fixed, but adjustable position between a screw and a coil spring, in the middle chamber a second cylindrical focusing lens carried by a slide and attached on one end with a spring to the casing and being displaceable perpendicularly to its optical axis, the optical axis of said focusing lenses being perpendicular to said optical base, a mirror located behind said observing opening which permits viewing the object to be photographed in two partial pictures, one partial picture of said object being directly produced in said mirror and the other partial picture being produced in said mirror through said focusing lenses, said displaceable focusing lens being in connection with said camera lens by means of a chain, a roller and a lever, in a fixed relationship, so that, when altering the position of said displaceable focusing lens in such a manner that the said two partial pictures coincide, the camera is in focus.

8. The combination, in a focusing device for a camera having an adjustable lens, of a casing provided in front with an opening for admitting light rays reflected by an object to be focused, and on the rear side with an observing opening, said casing being subdivided into three chambers, in one of said chambers a rhombic prism provided with two reflecting planes forming the optical base of the device, said optical base being positioned perpendicularly to the optical axis of said camera lens, one of said reflecting planes being adjacent to the observing opening, in the front chamber and in front of the other reflecting plane a cylindrical focusing lens located in a fixed, but adjustable position between a screw and a coil spring, in the middle chamber a second cylindrical focusing lens carried by a slide and attached on one end with a spring to the casing and being displaceable perpendicularly to its optical axis, the optical axis of said focusing lenses being perpendicular to said optical base, said observing opening permitting one to view the object to be photographed in two partial pictures, one partial picture of said object being directly produced in said observing opening and the other partial picture being produced in said opening through said rhombic prism and said focusing lenses, and means for connecting said displaceable focusing lens with the camera lens in a fixed relationship, so that, when altering the position of said displaceable focusing lens in such a manner that the two partial pictures coincide, the camera is in focus.

9. The combination, in a focusing device for a camera having an adjustable lens, of a casing provided in front with an opening for admitting light rays reflected by an object to be focused, and on the rear side with an observing opening, said casing being subdivided into three chambers, in one of said chambers a rhombic prism provided with two reflecting planes forming the optical base of the device, said optical base being positioned perpendicularly to the optical axis of said camera lens, one of said reflecting planes being adjacent to the observing opening, in the front chamber and in front of the other reflecting plane a cylindrical focusing lens located in a fixed, but adjustable position between a screw and a coil spring, in the middle chamber a second cylindrical focusing lens carried by a slide and attached on one end with a spring to the casing and being displaceable perpendicularly to its optical axis, the optical axis of said focusing lenses being perpendicular to said optical base, said observing opening permitting one to view the object to be photographed in two partial pictures, one partial picture of said object being directly produced in said observing opening and the other partial picture being produced in said opening through said rhombic prism and said focusing lenses, said displaceable focusing lens being in connection with said camera lens by means of a chain and a lever mechanism, in a fixed relationship, so that, when altering the position of said displaceable focusing lens in such a manner that the said two partial pictures coincide, the camera is in focus.

HANS FERDINAND TÖNNIES.